(12) United States Patent
Conversano et al.

(10) Patent No.: US 10,252,822 B2
(45) Date of Patent: Apr. 9, 2019

(54) PROCESS FOR ASSEMBLING AIRCRAFT CONTROL SURFACES

(71) Applicant: SALVER S.p.A., Rome (IT)

(72) Inventors: Pasquale Conversano, Rome (IT); Alessandro Lo Casale, Rome (IT); Daniele Capoccello, Rome (IT)

(73) Assignee: SALVER S.P.A., Rome (IT)

( * ) Notice: Subject to any disclaimer, the term of this patent is extended or adjusted under 35 U.S.C. 154(b) by 0 days.

(21) Appl. No.: 15/517,737

(22) PCT Filed: Oct. 8, 2015

(86) PCT No.: PCT/IB2015/057699
§ 371 (c)(1),
(2) Date: Apr. 7, 2017

(87) PCT Pub. No.: WO2016/055964
PCT Pub. Date: Apr. 14, 2016

(65) Prior Publication Data
US 2017/0240299 A1    Aug. 24, 2017

(30) Foreign Application Priority Data
Oct. 8, 2014   (IT) .............. RM2014A0575

(51) Int. Cl.
*B64F 5/10*    (2017.01)
*B64C 9/00*    (2006.01)
*B29D 99/00*   (2010.01)
*B64C 3/26*    (2006.01)

(52) U.S. Cl.
CPC ............ *B64F 5/10* (2017.01); *B29D 99/0028* (2013.01); *B64C 3/26* (2013.01); *B64C 9/00* (2013.01)

(58) Field of Classification Search
CPC ......... B64F 5/10; B29D 99/0028; B64C 3/26; B64C 9/00
See application file for complete search history.

(56) References Cited

U.S. PATENT DOCUMENTS 6,638,466 B1   10/2003   Abbott

FOREIGN PATENT DOCUMENTS

| WO | 2008082437 A2 | 7/2008 | |
|---|---|---|---|
| WO | WO-2010144009 A1 * | 12/2010 | ......... B29C 65/5057 |
| WO | WO-2013089598 A1 * | 6/2013 | ............. B29C 66/63 |

* cited by examiner

*Primary Examiner* — John L Goff, II
(74) *Attorney, Agent, or Firm* — Volpe and Koenig, P.C.

(57) ABSTRACT

A process for assembling aircraft control surfaces (1, 1'), in particular high-lift devices and wing portions, allows implementing smooth control surfaces in short times, wherein the control surface is defined by an upper skin (2) and by a lower skin (9), the upper skin being destined to form the leading edge (4) of the control surface by means of the connection to a front spar (3), wherein the upper skin and the lower skin are made of a laminar composite material which, not yet hardened, is fastened to structural elements (3, 5, 6, 7) of the control surface by means of an adhesive; and wherein the resin of the composite material and the adhesive are hardened simultaneously in autoclave.

1 Claim, 4 Drawing Sheets

PROCESS FOR ASSEMBLING AIRCRAFT CONTROL SURFACES

The present invention has as subject a process for assembling aeronautical components, in particular ailerons or high-lift devices, flaps in general, and other wing portions defining the so-called control surfaces of an aircraft.

In particular, the present invention relates the construction of the control surfaces of civil aircrafts such as the flaps and the slats, made of advanced composite material by means of an integrated co-curing process of the main structural elements, i.e. spars, stringers and the leading edge, with the aim of reducing the costs for assembling the portions and obtaining aerodynamically clean structures allowing a reduction in the fuel consumption of the aircrafts.

Under co-curing, in full concurrent curing, the action is meant of inducing solidification (or hardening) of a composite rolled section simultaneously to the adhesion of the latter to another material or support during solidification and however not yet hardened, or to a material suitable or prepared to an adhesion (balsa, foam, cellular or honeycomb material), by means of an adhesive. In the co-curing, the resins of the composite laminated element of the fastening adhesives then harden simultaneously.

The flaps or high-lift devices are mobile surfaces, integrated in the structure of the wings with the purpose of modifying, under control, the lift area of the same in order to obtain, especially in the landing and taking-off phases, a greater lift and then to keep, or establish the lifting force even at reduced speed.

The flaps are activated by the cockpit by means of the hydro-mechanical or electro-mechanical systems by means of a suitable control and they are controlled electronically.

The flaps are implemented by means of two outer elements called skins, that is the laminar component defining the control surface, integrating the structural elements, connected therebetween and to the transversal structures, called ribs, by means of riveting. The traditional constructions provide that the structural elements and the leading edge are connected therebetween by means of riveting.

The riveting, however, is a slow process retaining a considerable degree of accuracy and which however cannot implement a wholly smooth surface.

The U.S. Pat. No. 6,638,466 describes a process for assembling aeronautical control surfaces, wherein the control surface is defined by a lower skin and by an upper skin, the lower skin being destined to form the leading edge of the control surface by means of connection to a front spar.

The International application Nr. WO 2008/082437 describes a wing rib composite implemented with vacuum techniques.

The technical problem underlying the present invention is to provide a process for assembling control surfaces allowing to obviate the drawback mentioned with reference to the known art.

Such problem is solved by a process as defined in the enclosed claim 1.

The main advantage of the process according to the present invention lies in the fact of allowing to implement smooth control surfaces in short time.

The peculiarity of the invention lies in the fact that the amount of riveting is considerably reduced thanks to the production of the skins with the integrated structural elements, which avoids that they are installed subsequently by means of additional riveting.

The present invention will be described hereinafter according to a preferred embodiment thereof, provided by way of example and not for limitative purpose with reference to the enclosed drawings wherein.

The production system of these integrated structures provides the contemporary construction, through dedicated equipment, of the outer skin, of the inner structural elements and of the leading edge. This is implemented by means of a combined system of stiff metal tools and flexible tools so as to guarantee the required compaction of the rolled sections made of carbon fibres and to allow the treatment in autoclave.

The concept can be adapted even for trapezoidal and tapered shapes by adopting particular devices in planning the tools and in the mode of performing lamination due to the reduced thicknesses which are present at the ends of the structures.

Figure 1:
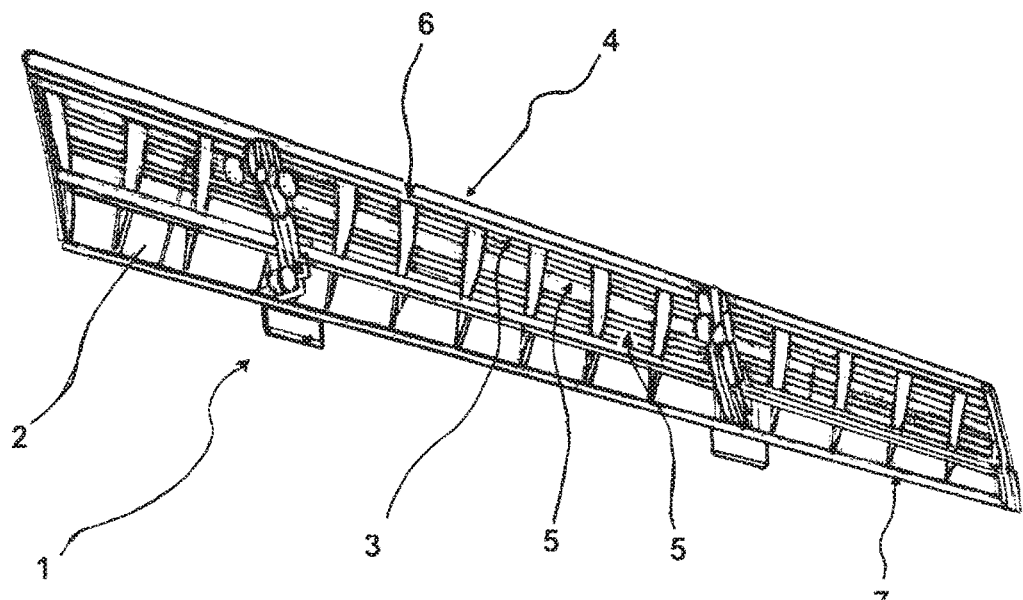
FIG. 1 shows a section perspective view of an outboard high-lift device obtained with a process according to the present invention.
Figure 6:
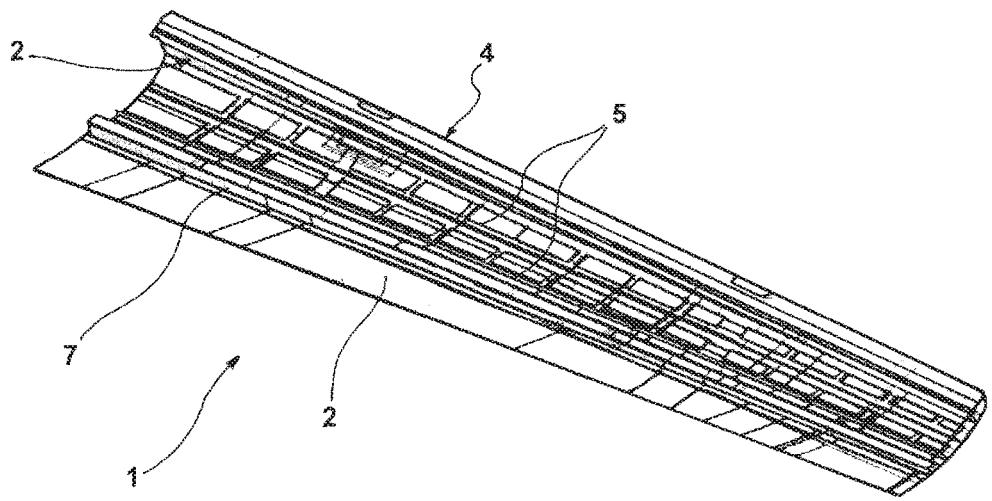
FIG. 6 shows a section perspective view of an inboard high-lift device obtained with a process according to the present invention, wherein the upper skin with spars and stringers integrated onto tapered structures typical of the outboard flaps can be seen.

By referring to FIGS. 1 and 6, a section of an outboard high-lift device 1, called flap in short, is obtained with a process according to the present invention; it comprises an upper skin 2 made of laminated material, in particular carbon fibre, implemented with a process of co-curing, or simultaneous hardening, to a front spar 3 defining the leading edge 4 of the flap.

Moreover, there are stringers 5 in intermediate position, a rear spar 6 and transversal ribs. These components are structural elements which are fastened, instead of by conventional riveting or nailing, with a co-curing step wherein the upper skin made of carbon fibre, not yet solidified, is fastened to the spars, the stringers and the ribs by means of an adhesive.

Under upper skin the control surface on the upper portion of the aileron is meant, it has to be noted that on the edge it is bent by adhering around the front spar 3 to form the leading edge 4 with the rear edge of a wing.

Figure 5:
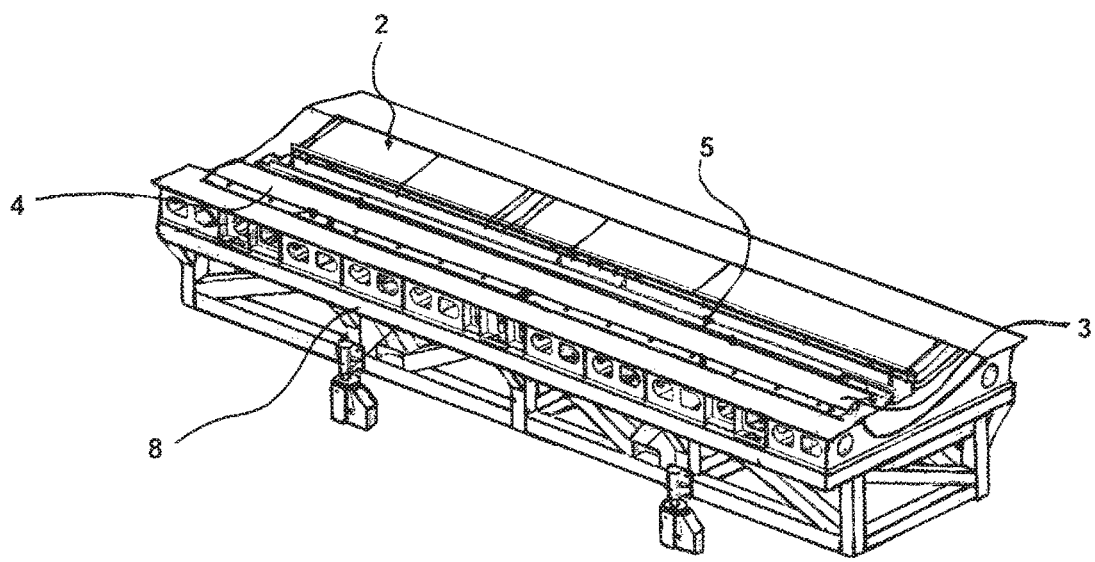
FIG. 5 shows a step of the assembling process according to the invention.

The whole assembly is inserted in an autoclave mounted on a suitable frame 8 (FIG. 5), inside thereof the resin of the carbon fibre and the adhesive harden simultaneously.

Figure 2:
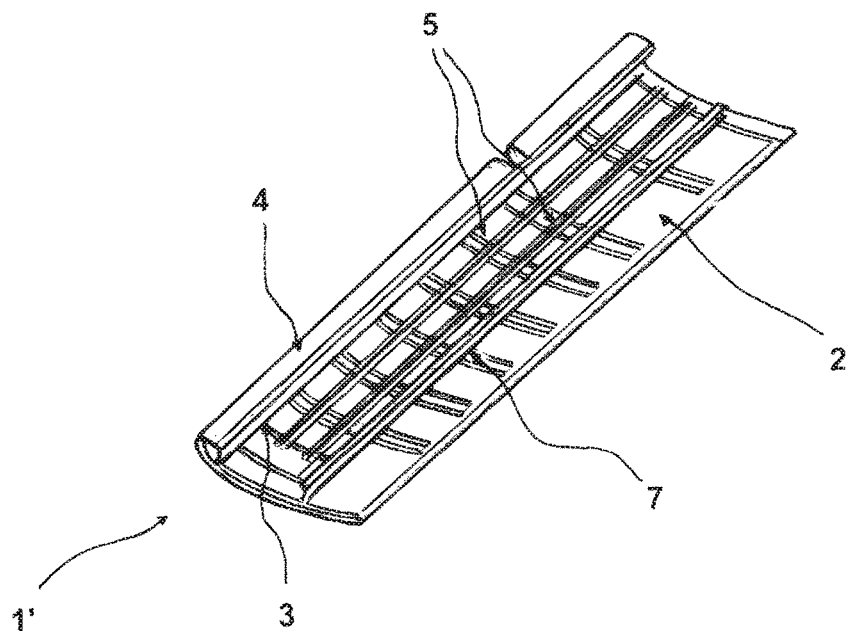
FIG. 2 shows a section perspective view of an inboard high-lift device obtained with a process according to the present invention.
Figure 3:
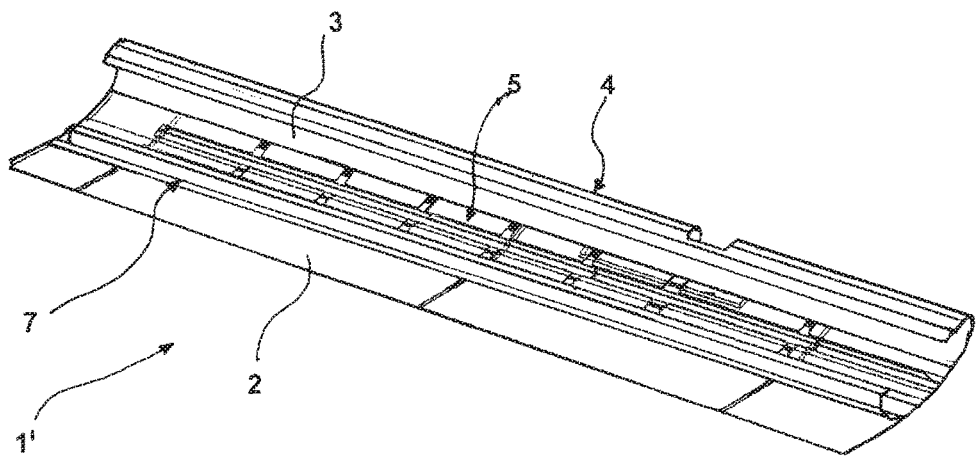
FIG. 3 shows a section perspective view of an inboard high-lift device obtained with a process according to the present invention, wherein the upper skin with spars, stringers and integrated leading edges can be seen, with a constant section structure typical of the inboard flaps.

On the contrary, FIGS. 2 and 3 show an inboard high-lift device 1' of an aircraft constructed according to the same process and the same reference numerals are used for the same portions.

The upper skin 2 is fastened to the front spar 3 and rear spar 7, to the stringers 5 and it forms the leading edge in an integrated way, by implementing a constant section structure typical of the inboard flaps.

Figure 4:
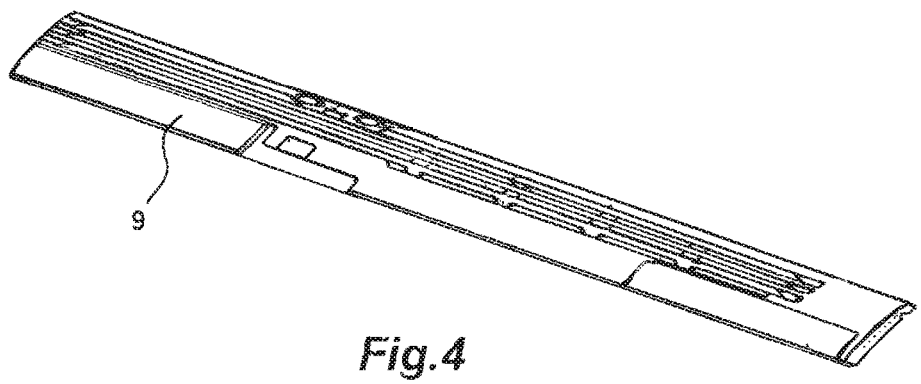
FIG. 4 shows a section perspective view of another portion of an inboard high-lift device obtained with a process according to the present invention, wherein the lower skin with spars, stringers and integrated leading edges can be seen, with a constant section structure typical of the inboard flaps.

By referring to FIG. 4, instead, a lower skin 9 is shown, which forms the control surface faced downwards and it joins to the upper skin 2.

FIG. 6, instead, illustrates an example of upper skin 2 with front spar 3 and rear spar 7 and stringers 5 integrated onto a tapered structure which is typical of an outboard flap.

Figure 7:
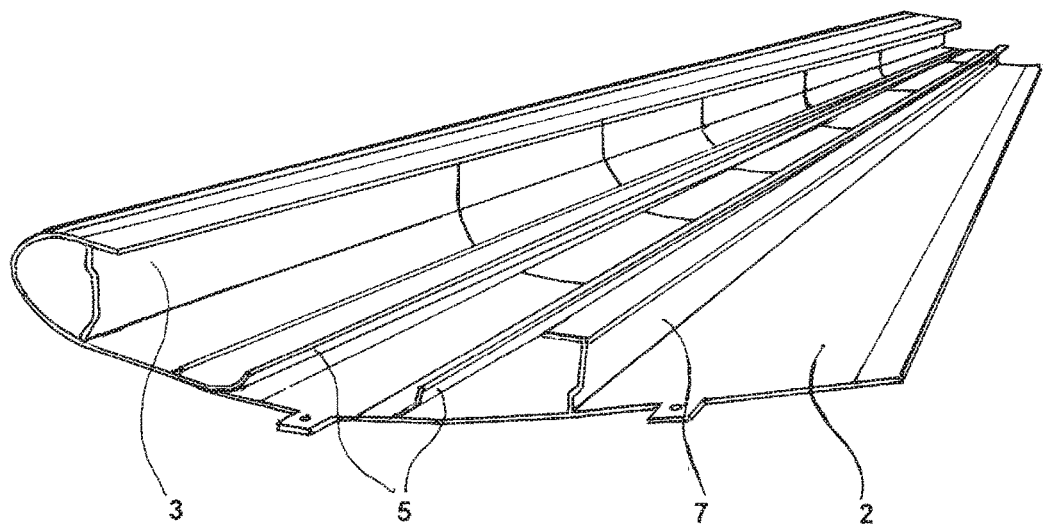
FIG. 7 shows an image of an upper skin during assembling.
Figure 8:
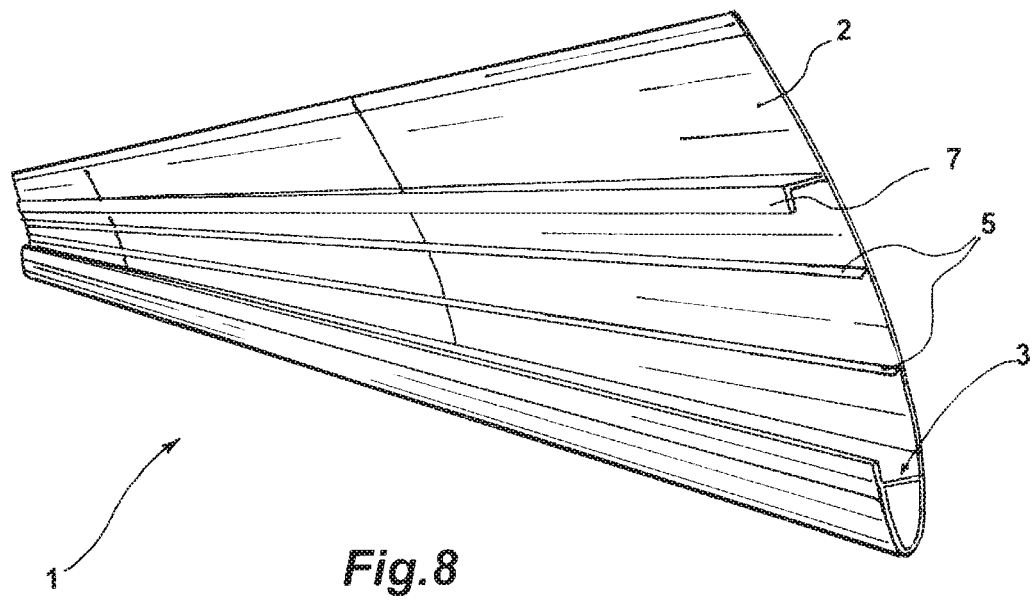
FIG. 8 shows another image of an upper skin during assembling according to a different angle.

By referring to the images shown in FIGS. 7 and 8, they illustrate in details some portions of outboard flaps. It has to be noted that the control surface determined by the upper skin 2, fastened to the front spar 3 and rear spar 7 and to the stringers, does not have riveting.

Figure 9:
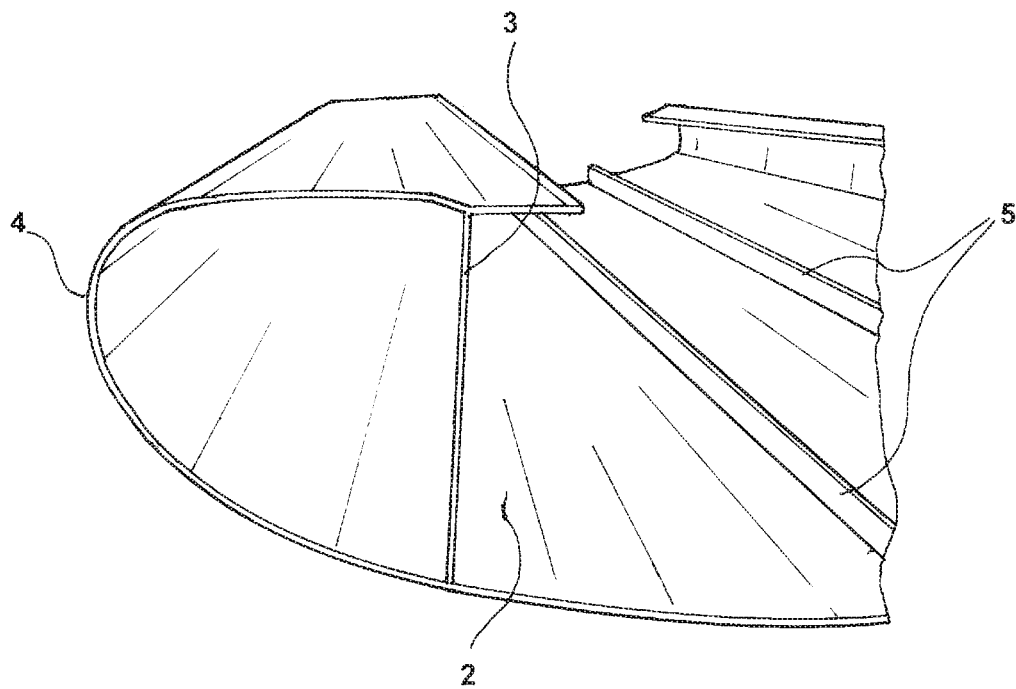
FIG. 9 shows an image of a detail of an upper skin with integrated leading edge.

In FIG. 9, it is appreciated that the upper skin 2 is wholly integrated onto the front spar 3 to form the leading edge 4, still without any riveting.

The product of the invention has been subjected to functionality tests which have shown that the structural concept and the production method guarantee the performances requested by the certification requirements and therefore the concept can be applied to other types of similar structures existing in the commercial, and not, aircrafts.

To the above described assembling process a person skilled in the art, with the purpose of satisfying additional and contingent needs, could introduce several modifications and variants, however all within the protection scope of the present invention, as defined by the enclosed claims.

The invention claimed is:

1. A process for assembling an aircraft control surface (1, 1'), of high-lift devices and wing portions, wherein the control surface is defined by an upper skin (2) and by a lower skin (9) made of a laminar composite material, assembled by a front spar, a rear spar, longitudinal stringers (5) and transversal ribs, the process comprising:

forming a leading edge bending and adhering one edge of the upper skin around the front spar with an adhesive therebetween;

fastening, the rear spar, the longitudinal stringers and the transversal ribs to said upper skin by means of said adhesive;

placing the lower skin to join the upper skin to form the control surface obtaining an assembly mounted on a frame, the laminar composite material of the upper and lower skins being not yet hardened; and placing said assembly with said frame in an autoclave and simultaneously hardening both the laminar composite material of the upper and lower skins and the adhesive.

\* \* \* \* \*